United States Patent [19]

Moore

[11] 4,128,260

[45] Dec. 5, 1978

[54] TANDEM WHEEL SUSPENSION FOR A VEHICLE FRAME

[76] Inventor: Arthur R. Moore, 58354 Hilly La., Elkhart, Ind. 46514

[21] Appl. No.: 832,173

[22] Filed: Sep. 12, 1977

[51] Int. Cl.$^2$ ............................................... B60G 9/00
[52] U.S. Cl. .................................... 280/676; 280/685; 267/20 R
[58] Field of Search ............... 280/676, 677, 678, 679, 280/680, 681, 685; 267/20 R

[56] References Cited

U.S. PATENT DOCUMENTS

| | | | |
|---|---|---|---|
| 1,866,964 | 11/1932 | Markham | 106/180 |
| 2,953,390 | 9/1960 | Hogstrum | 280/104.5 |
| 3,069,184 | 12/1962 | Hickman | 280/104.5 |
| 3,129,953 | 4/1964 | Hickman | 280/104.5 |
| 3,157,238 | 11/1964 | Kraemer | 180/22 |
| 3,202,439 | 8/1965 | Hickman | 280/104.5 |
| 3,301,573 | 1/1967 | Hickman | 280/104.5 |
| 3,875,690 | 4/1975 | Hancock | 180/85 |
| 3,944,247 | 3/1976 | Cook | 280/124 R |

*Primary Examiner*—Philip Goodman
*Attorney, Agent, or Firm*—Oltsch, Knoblock & Hall

[57] ABSTRACT

A walking beam is located under each of the main longitudinal members of the vehicle frame and carries at each of its ends a wheel spindle journaling a wheel for ground engagement. A shock absorbing resilient member is carried between upper and lower supports connected respectively to each main longitudinal member and walking beam. A pivot member is mounted to the walking beam below the lower resilient member support and serves to define the pivot axis for each walking beam. Each pivot member is connected to the vehicle frame by a transverse pivot shaft and is braced by a longitudinally extending strut.

20 Claims, 13 Drawing Figures

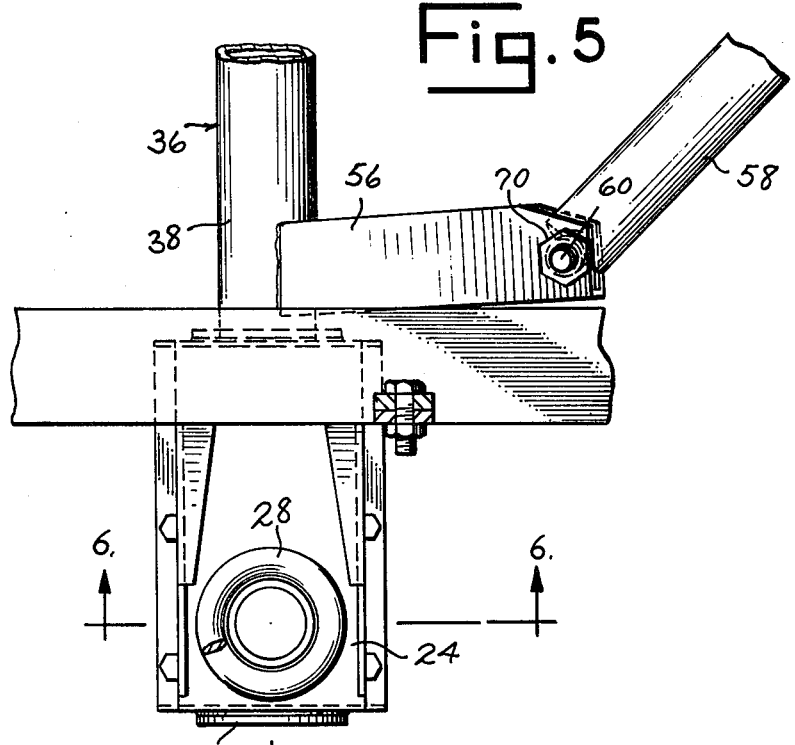
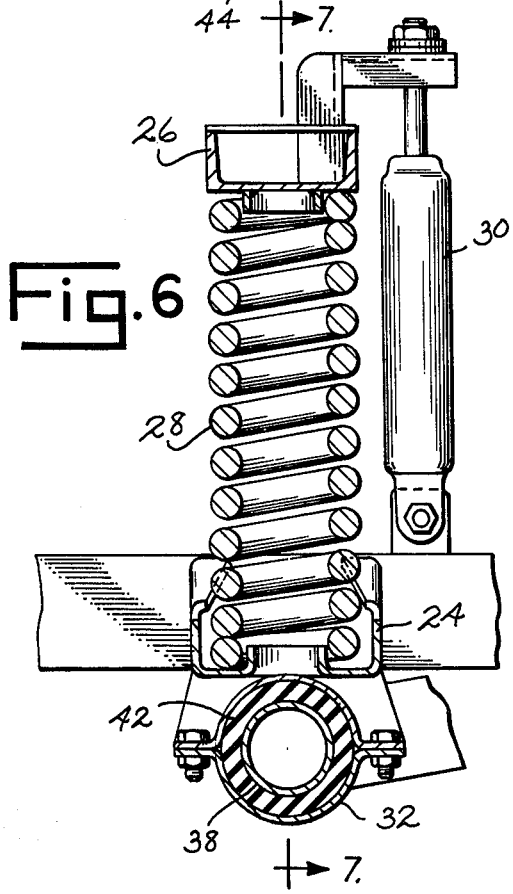
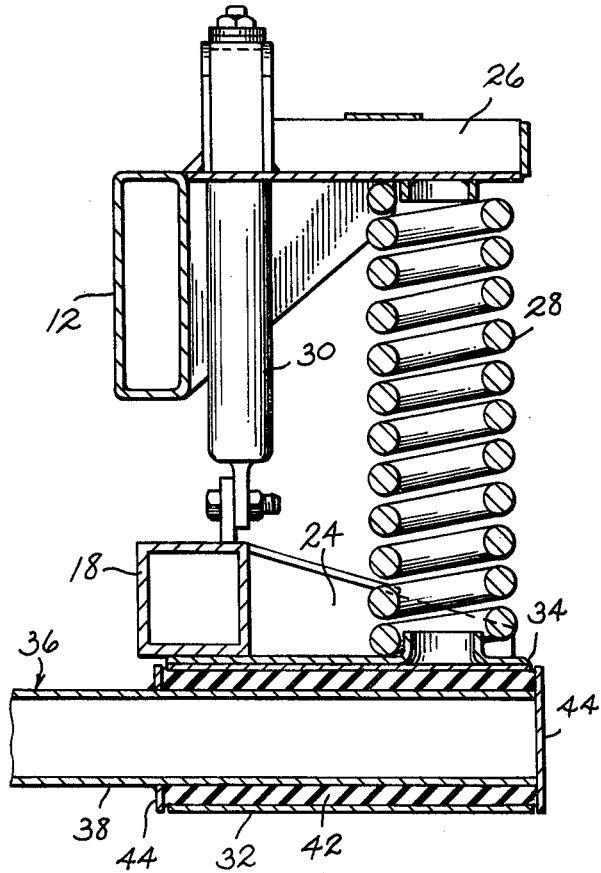

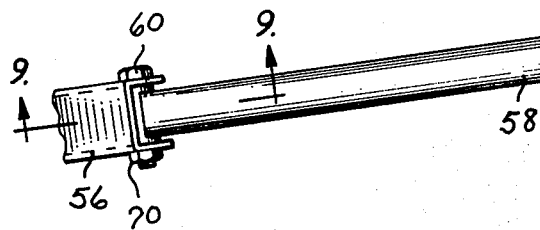
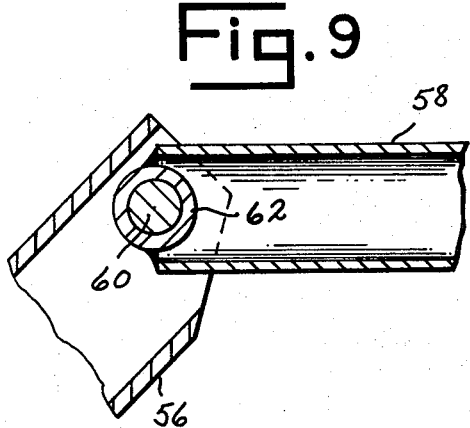
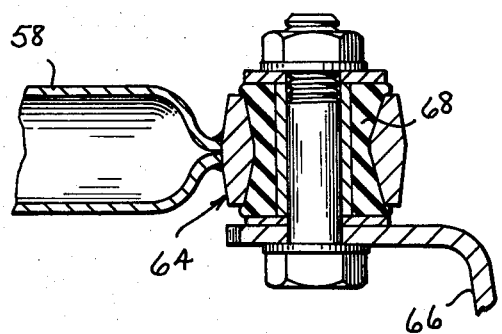
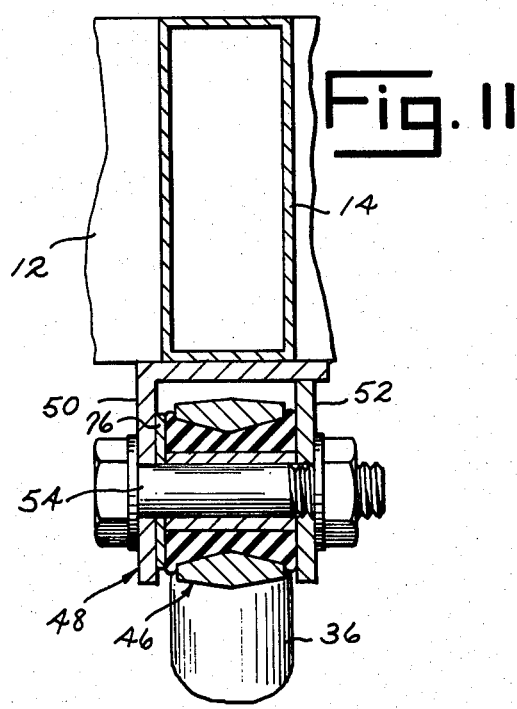

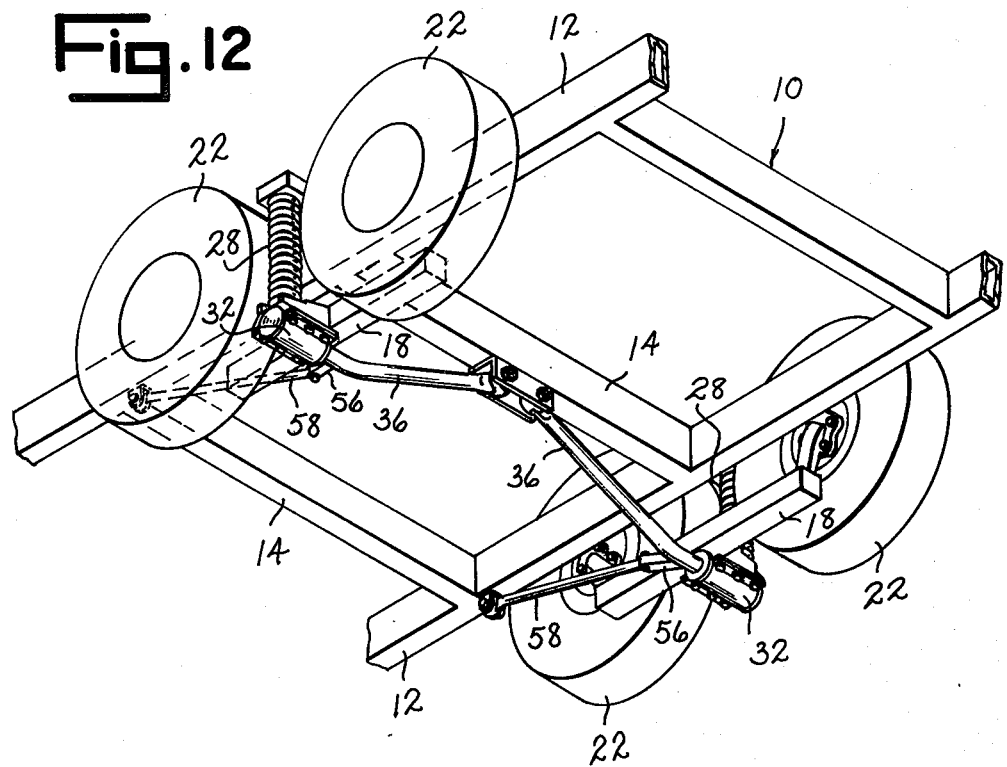
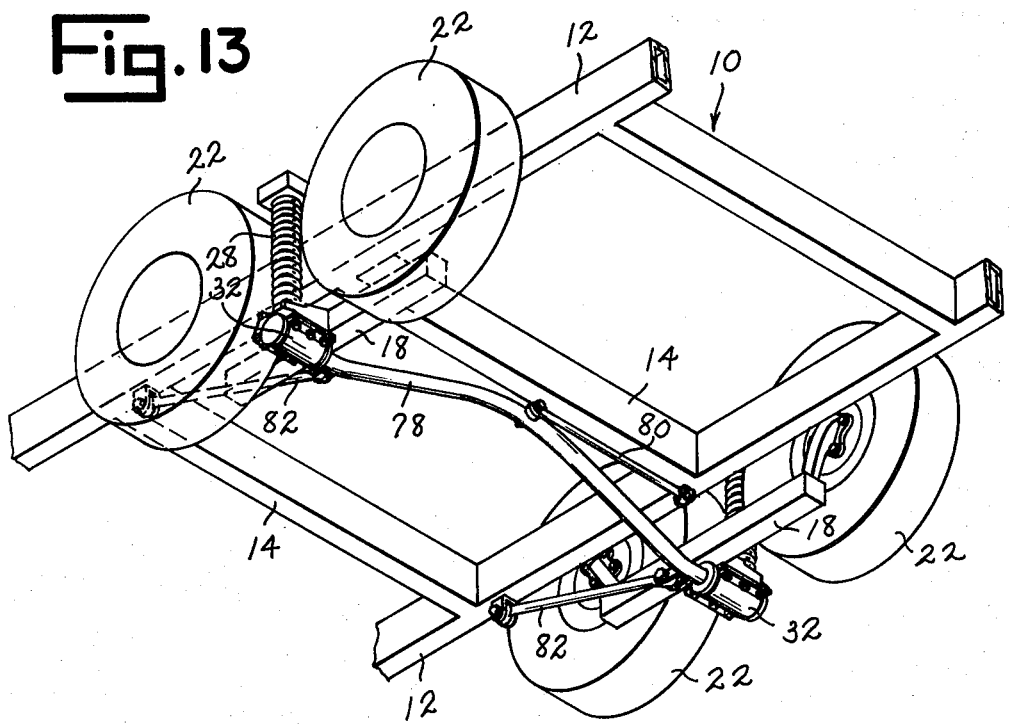

TANDEM WHEEL SUSPENSION FOR A VEHICLE FRAME

SUMMARY OF THE INVENTION

This invention relates to a tandem wheel suspension for a vehicle frame and will have specific application to a suspension utilizing walking beams having the tandem wheels journaled thereto.

A walking beam with its tandem wheels connected to the opposite ends thereof by means of wheel spindles is positioned under each main longitudinal member of the frame. A shock absorbing resilient member is retained between the tandem wheels of each walking beam by an upper support connected to the adjacent main longitudinal member of the frame and lower support connected to the walking beam. A pivot housing is mounted to each walking beam below the lower support for the resilient member. A transversely directed pivot shaft extends from the pivot housing to the frame and serves to define the pivot axis for the walking beam. The pivot shaft is braced by a longitudinally extending strut which is also connected to the vehicle frame.

The construction of the tandem wheel suspension of this invention causes the static and the vertical component of the dynamic vehicle frame load to be transmitted directly to the walking beam through the resilient member, with the pivot housing and its shaft bearing none of the static or vertical component of the dymanic load. This allows for lighter design and more economical manufacture of the suspension system.

Additionally, the transversely extending, frame connected pivot shaft of each walking beam creates a force during cornering which counteracts the normal centrifugal cornering force imposed upon the vehicle frame. This aspect of the invention improves cornering and stability. Also, the longitudinally extending strut connected between the frame and pivot shaft of each walking beam serves to reduce pivot shaft deflection and to increase stability of the walking beam and wheels during braking.

Accordingly, it is an object of this invention to provide a tandem wheel suspension for a vehicle frame which imparts a soft, low frequency ride to the frame without sacrificing vehicular sidesway and cornering stability.

Another object of this invention is to provide a suspension which is free from friction.

Another object of this invention is to provide a suspension which requires a minimal amount of maintenance. Another object of this invention is to provide a suspension which may be simply installed and adjusted for operational use.

Another object of this invention is to provide a tandem wheel suspension which provides a superior sidesway and cornering stability for trailers having a high center of gravity, such as travel and utility trailers.

Still another object of this invention is to provide a tandem wheel suspension which is of light weight construction without a sacrifice in strength.

Still another object of this invention is to provide a suspension which provides for a minimum weight of upsprung vehicle mass.

Still another object of this invention is to provide a tandem wheel suspension which is of economical construction.

Still another object of this invention is to provide a suspension which accommodates uniform wheel loading regardless of grade change or type of terrain.

Still another object of this invention is to provide a suspension with nearly uniform wheel loading during braking to prevent wheel skip or hop.

Other objects of this invention will become apparent upon a reading of the following description of the invention.

BRIEF DESCRIPTION OF THE DRAWINGS

FIG. 5 is a fragmentary sectional view taken along line 5—5 of FIG. 3.

FIG. 6 is a detailed sectional view taken along line 6—6 of FIG. 5.

FIG. 7 is a sectional view taken along line 7—7 of FIG. 6.

FIG. 8 is a sectional view taken along line 8—8 of FIG. 2.

FIG. 9 is a fragmentary sectional view taken along line 9—9 of FIG. 8.

FIG. 10 is a fragmentary sectional view taken along line 10—10 of FIG. 8.

FIG. 11 is a sectional view taken along line 11—11 of FIG. 2.

FIG. 12 is a bottom fragmentary perspective view of a vehicle frame showing a modified embodiment of the suspension of this invention connected thereto.

FIG. 13 is a bottom fragmentary perspective view of a vehicle frame having another modified embodiment of the suspension of this invention connected thereto.

DESCRIPTION OF THE PREFERRED EMBODIMENTS

Figure 1:
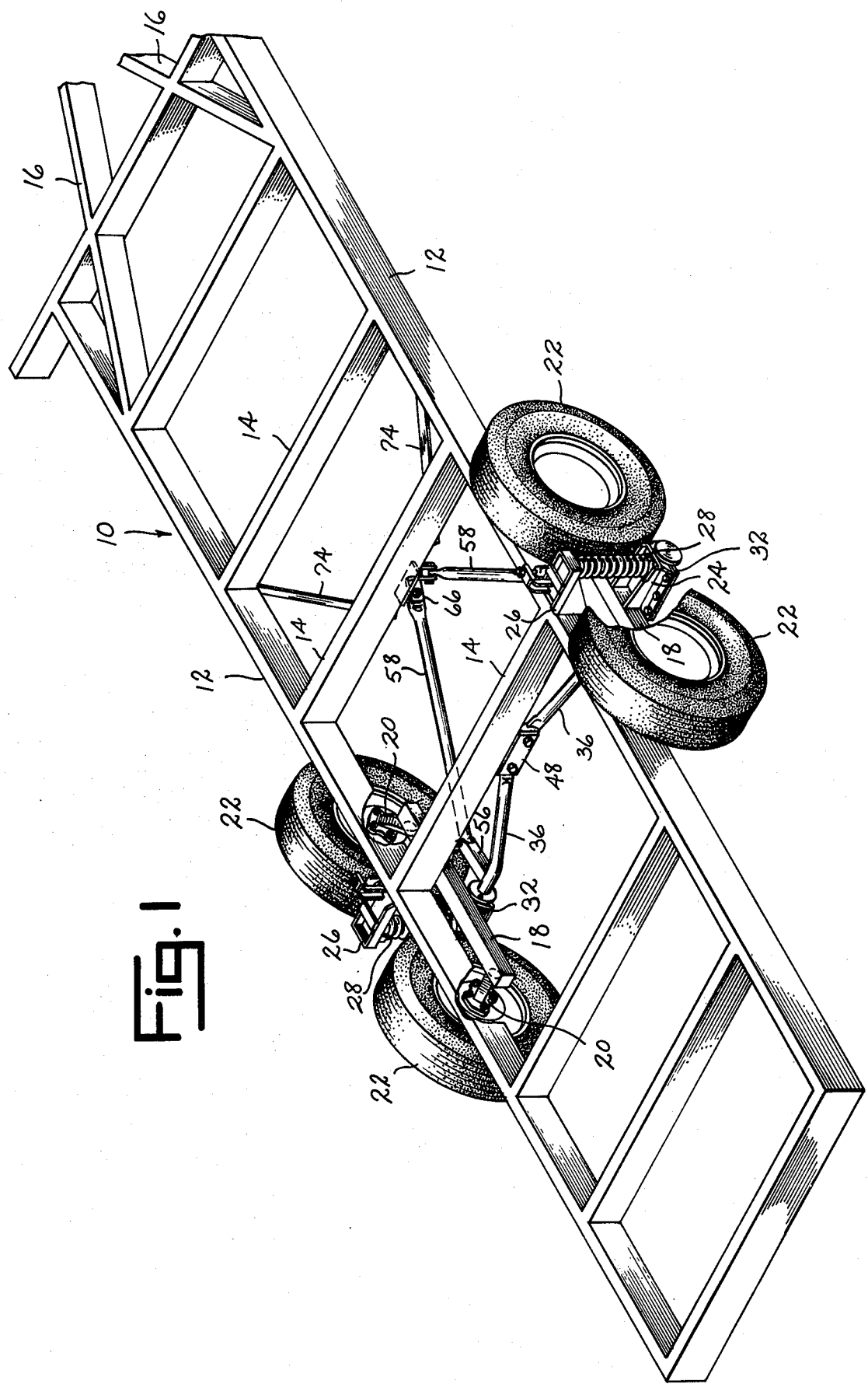
FIG. 1 is a perspective view of a vehicle frame having one embodiment of the suspension of this invention connected thereto and with portions of the frame broken away for purposes of illustration.
Figure 2:
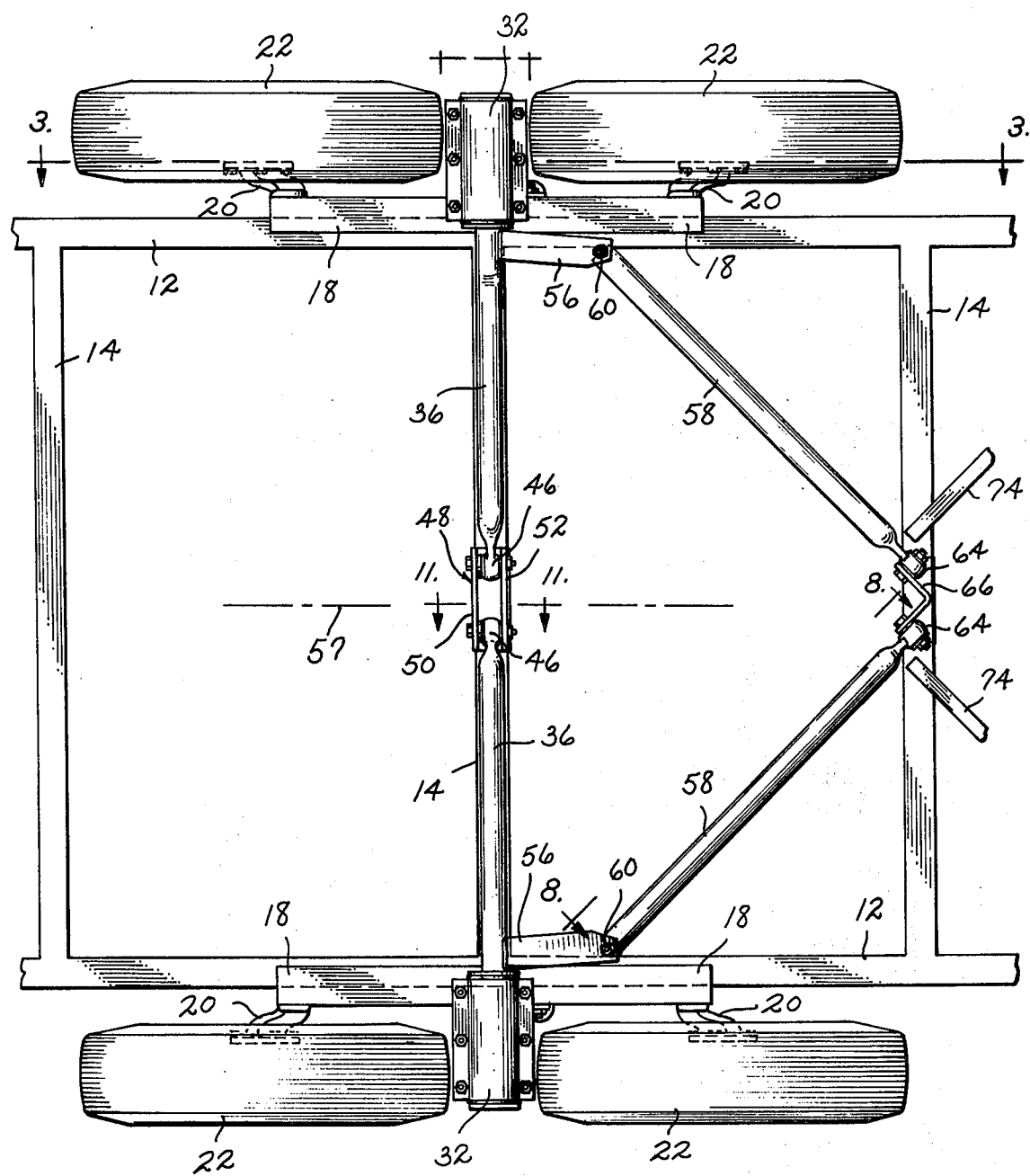
FIG. 2 is a fragmentary bottom plan view of the suspension and frame shown in FIG. 1.

The preferred embodiments illustrated are not intended to be exhaustive or to limit the invention's precise forms disclosed. They are chosen and described in order to best explain the principles of the invention and its application and practical use to thereby enable others skilled in the art to best utilize the invention.

The vehicle frame 10 illustrated in the figures includes parallel main longitudinal members 12 interconnected by transverse members 14. Frame 10 is of a steel construction, with its longitudinal and transverse members 12 and 14 being of a four-sided tubular configuration. The size, number, positioning and cross sectional configuration of longitudinal and transverse frame members 12 and 14 will vary, depending upon the load and size which the vehicle frame is to carry. Frame 10 includes a pair of diagonal members 16 which project from the front end of the frame and to which a hitch (not shown) is connected for connection to a suitable towing vehicle. The vehicle frame which accommodates the suspension of this invention may also include a tongue or other type of coupling arrangement for connection to a towing vehicle.

The suspension of this invention includes a pair of walking beams 18 each having a wheel spindle 20 rigidly connected at each end. The tired wheel 22 is journaled to each wheel spindle 20 in customary fashion. The length of each walking beam 18 is sufficient to allow an accommodating space between wheels 22 carried by the beam. A walking beam 18 is positioned below and in general vertical alignment with each longitudinal frame member 12 at opposite sides of frame 10. With each walking beam 18 positioned below a longitudinal frame member 12, wheels 22 of the beam are located exteriorly of or laterally outwardly from the vertical plane of the overlying longitudinal frame member. A lower spring seat 24 is rigidly secured to each walking beam 18 and is located to project into the space between wheels 22 carried by the beam. An upper spring seat 26 is rigidly connected to each longitudinal frame member 12 and is located vertically above a lower spring seat 24. Each upper spring seat 26 projects between wheels 22 of the underlying walking beam 18. A helical spring 28 is supported in compression between each pair of vertically oriented lower and upper spring seats 24 and 26. Each spring 28 is located over and in vertical alignment with the tracking center 23 of the adjacent wheels 22. The term "tracking center" as used herein and in the following claims refers to that line of travel of a pair of tandem wheels 22 over the road at the center of the road-engaging treads of the wheels. Each spring 28 serves upon further compression to absorb road shock transmitted to wheels 22 during road travel of frame 10. A shock absorber 30 is mounted between each longitudinal frame member 12 and its underlying walking beam 18, preferably adjacent lower and upper spring seats 24 and 26 and toward the front of frame 10. Shock absorbers 30 serve to retain contact between springs 28 and spring seats 24 and 26 during road use of frame 10 and to dampen vibrations caused by repeated compression of springs 28 and the rotational vibration of walking beams 18.

A pivot housing 32 is rigidly connected to each walking beam 18 directly beneath its attached lower spring seat 24. Each pivot housing 32 is located between wheels 22 of its connected walking beam 18 and projects laterally from under the walking beam to the end 34 of overlying lower spring seat 24. Aligned with upper spring seats 26 is a transverse frame member 14. A pivot shaft 36 extends between each pivot housing 32 and the transverse frame member 14 aligned with upper spring seats 26. Each pivot shaft 36 includes a generally horizontal part 38 and an upwardly bent part 40. Horizontal part 38 of each pivot shaft extends into a pivot housing 32. An elastomeric liner 42, which in the preferred embodiment is of a rubber composition, is located and compressed in frictional contact between the outer surface of each pivot shaft horizontal part 38 and the inner surface of its accommodating pivot housing 32 to allow the housing and connected walking beam 18 to restrictively rotate relative to the pivot shaft. Retainers 44 are connected to each pivot shaft horizontal part 38 at opposite ends of its accommodating pivot housing 32 to prevent liner-slipping withdrawal of the pivot shaft from the pivot housing and to maintain liner 42 in compression between the pivot shaft and housing.

The bent part 40 of each pivot shaft 36 is anchored by an elastomeric joint 46 to a bracket 48 mounted to the underside of aligned transverse frame member 14. Bracket 48 is centered on transverse frame member 14 between longitudinal frame members 12 and includes an L-shaped part 50 and a parallel plate part 52. Joint 46 of each pivot shaft 36 is connected by a pivot pin 54 extending between part 50 and plate 52 of bracket 48 with its pivot axis being laterally offset in the direction of its associated walking beam 18 from the frame longitudinal center line 57.

A strut arm 56 is rigidly connected at one end to each pivot shaft 36 at its horizontal part 38 next to its rotatively connected pivot housing 32. Each strut arm 56 projects forwardly from its connected pivot shaft 36 toward the front of the frame 10. A strut part 58 is connected at one end to the forward end of each strut arm 56 and at is opposite end to a forwardly located transverse frame member 14. The connection between each strut part 58 and strut arm 56 is by way of a threaded pin 60 which extends through the strut arm and a sleeve 62 which is welded or otherwise connected to the strut part. The opposite end of each strut part 58 is pivotally connected by a joint 64 to a V-shaped bracket 66 secured to the underside of the forwardly located transverse frame member 14. Joint 64 at the forward end of each strut part 58 includes an elastomeric liner 68 and is of a construction similar to joints 46 of pivot shafts 36. The elastomeric liner in joints 46 and 64 is of a rubber composition in the preferred embodiment and serves to allow for pivot shaft and strut part deflection both radially and axially.

Figure 3:
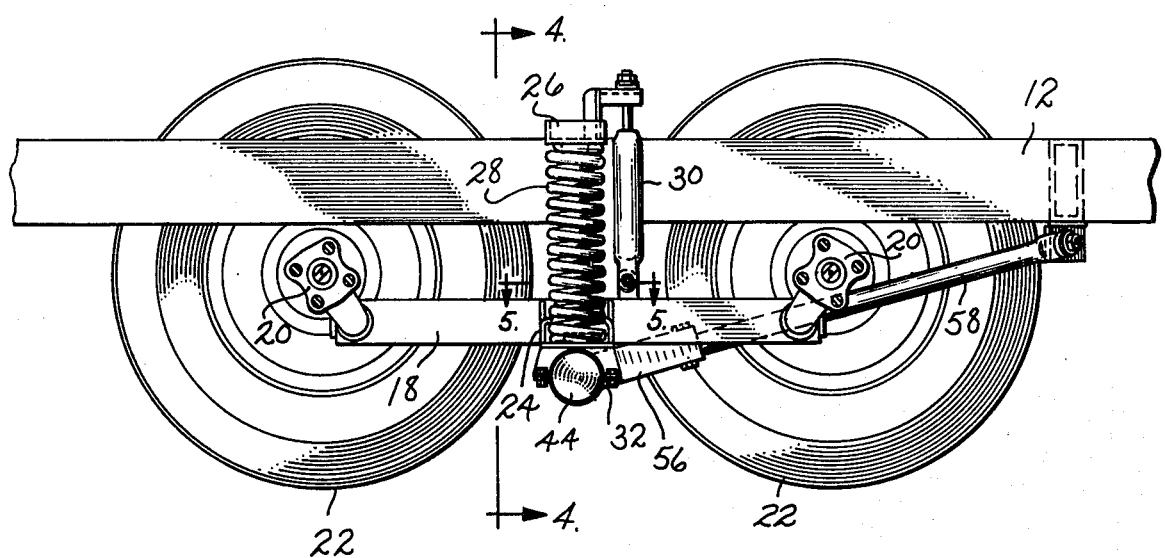
FIG. 3 is a sectional view taken along line 3—3 of FIG. 2.
Figure 4:
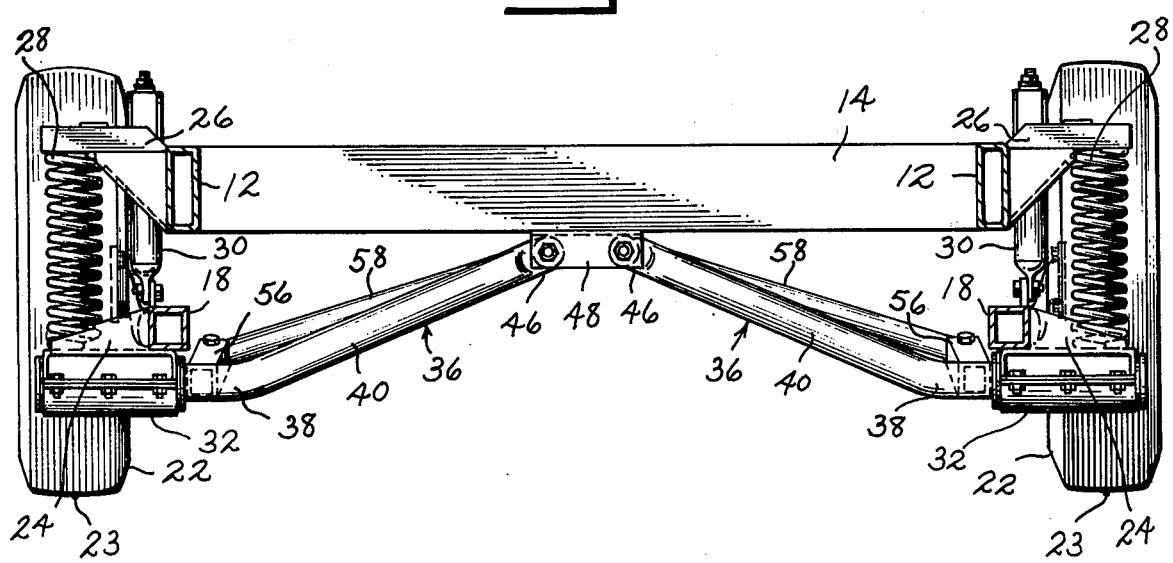
FIG. 4 is a cross sectional view taken along line 4—4 of FIG. 3.

The pin 60 joining each strut part 58 and strut arm 56 is used to accommodate assembly and adjustment of the suspension. Once assembly and adjustment of the suspension is completed, a nut 70 is tightened upon each pin 60 to rigidify the strut part to strut arm connection. Each strut part 58 could be welded to a strut arm 56 for operational purposes except for ease of assembly and adjustment of the suspension. Frame joint 46 of each pivot shaft 36 and frame joint 64 of each strut part 58 are longitudinally aligned so as to generally parallel the longitudinal center line 57 of frame 10 and the tracking centers 23 of wheels 22. Each strut arm 56 is angled slightly upwardly, as best seen in FIG. 3, so as to project the axis of its connected strut part 58 through the pivot axis of the adjacent walking beam vertically over the tracking center of connected wheels 22. Diagonal braces 74 are connected between transverse frame member 14 carrying bracket 66 and forward parts of longitudinal frame members 12.

Operation of the above described suspension is as follows. During use of frame 10, the static frame load and the vertical component of the dynamic frame load will be transferred directly to the walking beams 18 through springs 28. No static frame load or dynamic vertical component of the frame load will be carried by pivot shafts 36 or associated pivot housings 32 and liners 42.

During turning of frame 10, the tandem wheels 22 at the outside of the turn urge connected walking beam 18 laterally inwardly where resistance is met by connected pivot shaft 36. This inward translational force upon pivot shaft 36 will be transmittted to its frame joint 46, which, because of its offset position along the center line of vehicle frame 10, causes a countermoment to be produced that is directed toward the center of the frame. A similar countermoment is produced by the pull imposed upon the other pivot shaft 36 by the wheels 22 at the inside of the turn. Such countermoments resist the inertial force of the frame and the tendency of the frame and its load to roll during a turn by assisting springs 28 in supporting the frame. Additionally, similar countermoments are produced to resist lateral shifting of the frame load, such as can be caused by lateral wind gusts and vacuum pockets created by passing vehicles.

During braking, strut parts 58 in conjunction with connected strut arms 56 are placed in tension to produce a countermoment upon pivot shafts 36 to counter the moments generated by the longitudinal braking forces upon the pivot shafts. This reduces the longitudinal deflection of the pivot shafts relative to frame 10 and increases the stability of the walking beams and wheels.

The tracking centers of tandem wheels 22 can be adjusted reative to frame 10 by the placement of one or more shim washers 76 (see FIG. 11) between L-shaped part 50 of bracket 48 and pivot joints 46. Through the use of shim washers 76 each walking beam 18 can be pivoted in a horizontal plane relative to frame 10 about its associated strut arm pin 60.

Elastomeric liner 42 located and compressed in frictional contact between pivot shafts 36 and walking beam pivot housings 32, as well as the elastomeric liners in the joints 46 of the pivot shafts and joints 64 of the strut parts, allow for a friction-free suspension of simple maintenance. The wide transverse distance between springs 28 which are positioned exteriorly of longitudinal frame members 12 reduces side sway of the frame. In some embodiments of this invention air bags, elastomeric bodies loaded in compression or shear and similar compressive means could be substituted for springs 28 between walking beams 18 and longitudinal frame members 12. Also, an elastomeric body in operative association with each helical spring could be used between each walking beam and overhead longitudinal frame member. In the following claims the term "resilient means" is used to include springs, air bags, elastomer bodies, other compressive or shock absorbing means and combinations thereof.

The suspension of this invention is modified in FIG. 12 by connecting each strut part 58 to an overlying longitudinal frame member 12 at a forward location on the frame member. This construction of the suspension will produce countermoments to the roll of the frame and lateral shifting of the frame load during use. Additionally, the pivot shafts 36 will carry no static or vertical component of the dynamic trailer frame load. Pivot shaft deflection upon braking will also be reduced, but not as effectively as in the embodiment illustrated in FIGS. 1-11, since strut parts 58 are not angled to direct the countermoments upon the pivot shafts over the tracking centers of wheels 22.

In FIG. 13 another embodiment of the suspension of this invention is illustrated. In this embodiment, pivot shafts 36 previously described are formed into a single integral shaft 78 which extends transversely of frame 10 from one pivot housing 32 to the other pivot housing 32. A stabilizer arm 80 is mounted between the frame and the center of pivot shaft 78 to anchor the pivot shaft to the frame. A strut 82 is pivotally connected at one end to each longitudinal frame member 12 and at its other end to pivot shaft 78 adjacent each pivot housing 32. The pivot connections of struts 82 to longitudinal frame members 12 and pivot shaft 78 are of the elastomeric joint type. Additionally, the joints connecting the stabilizer arm to frame 10 and shaft 78 are of the elastomeric type. In this embodiment of the suspension, pivot shaft 79 will not bear vertical dynamic or static frame loads during use.

It is to be understood that the invention is not to be limited to the details above given, but may be modified within the scope of the appended claims.

What I claim is:

1. A tandem wheel suspension used with a vehicle frame having spaced longitudinal members interconnected by spaced transverse members, said suspension comprising a walking beam located below and extending lengthwise of each longitudinal member, a wheel assembly journaled at each end of each walking beam, each wheel assembly including a wheel positioned outwardly from the vertical plane of the adjacent overhead longitudinal member and a spindle mounted at one end to the wheel and at the other end to a said walking beam, a lower support connected to each walking beam between the spindles of the wheel assemblies jounaled thereto, an upper support connected to each longitudinal member vertically oriented above a said lower support, each vertically oriented upper and lower supports positioned outwardly of the vertical plane of the respective connected longitudinal member and walking beam, resilient means for absorbing road induced shocks carried in contact between each vertically oriented upper and lower supports, pivot means anchored to said frame and journaled to each walking beam in lateral alignment with the lower support connected thereto to provide an axis of rotation for said beam, each walking beam being shiftable vertically between upper and lower operative positions relative to its overhead longitudinal member upon resilient means compression and expansion, said wheel assemblies and connected walking beams and supported resilient means excluding said pivot means constituting the supporting means for all vertical loads upon said frame.

2. The wheel suspension of claim 1 wherein each pivot means is centered between the spindles of the wheel assemblies carried by its connected walking beam.

3. The wheel suspension of claim 2 wherein the wheels connected to each walking beam have a tracking center, each resilient means being located over and in vertical alignment with a said tracking center.

4. The wheel suspension of claim 3 wherein each resilient means is a helical spring supported at its ends by said vertically oriented upper and lower supports.

5. The wheel suspension of claim 3 wherein each pivot means is a shaft journaled at one end to a said walking beam and extending therefrom transversely relative to said longitudinal member.

6. The wheel suspension of claim 5 wherein each pivot means shaft is pivotally connected at its other end to said frame between the vertical planes of said longitudinal members.

7. The wheel suspension of claim 6 wherein each pivot means shaft is pivotally connected at its other end to said frame between the longitudinal center line of said frame and the vertical plane of its pivotally connected walking beam.

8. The wheel suspension of claim 7 wherein each pivot means shaft to frame connection is adjacently offset from the longitudinal center line of said frame.

9. The wheel suspension of claim 8 wherein each pivot means shaft to frame connection includes a resilient part allowing restricted two-dimensional displacement of the other end of said pivot means shaft relative to the frame.

10. The wheel suspension of claim 7 and strut means connected between each pivot means shaft and frame for restraining the pivot means shaft against longitudinal deflection relative to the frame.

11. The wheel suspension of claim 3 wherein each pivot means is a shaft extending transversely relative to said longitudinal members and having each end journaled to a said walking beam.

12. A tandem wheel suspension used with a vehicle frame having spaced longitudinal members interconnected by transverse members, said suspension comprising a walking beam located below and extending longitudinally of each longitudinal member, a wheel assembly journaled at each end of each walking beam, the wheel assemblies journaled to each walking beam having a tracking center, resilient means for absorbing road induced shock carried in shock absorbing association between each longitudinal member and its underlying walking beam, each walking beam being shiftable vertically between upper and lower operative positions relative to its overhead longitudinal member upon resilient means compression and expansion, a pivot shaft extending transversely to said frame and having one end connected to each walking beam to provide an axis of rotation for the walking beam, each pivot shaft having its other end anchored to said frame between the longitudinal center line of the frame and a vertical plane passing through the tracking center of the wheel assemblies journaled to the shaft connected walking beam wherein lateral forces exerted upon each walking beam due to wheel to road surface contact during movement of said frame will be transmitted through each pivot shaft to said frame to produce a force upon said frame to resist any lateral shift in frame loading, and means for restraining longitudinal deflection of each pivot shaft relative to said frame.

13. The wheel suspension of claim 2 wherein each pivot shaft other end is anchored to said frame adjacent said frame longitudinal center line.

14. The wheel suspension of claim 13 wherein each pivot shaft other end is anchored to a frame connected bracket, shim means between said bracket and each pivot shaft other end to vary the location of the pivot shaft other end along the longitudinal dimension of the frame whereby the tracking center of the wheel assemblies journaled to the shaft connected walking beam will be shifted relative to said longitudinal center line of the frame.

15. The wheel suspension of claim 13 wherein each pivot shaft other end is anchored to said frame by a pivot connection, said pivot connection including a resilient part allowing restricted two-dimensional displacement of the pivot shaft other end relative to the frame.

16. A tandem wheel suspension used with a vehicle frame having spaced longitudinal members interconnected by spaced transverse members, said suspension comprising a walking beam located below and extending longitudinally of each longitudinal member, a wheel assembly journaled at each end of said walking beam, resilient means for absorbing road induced shock carried in shock absorbing association between each longitudinal member and its underlying walking beam, each walking beam being shiftable vertically between upper and lower operative positions relative to its overhead longitudinal member upon resilient means compression and expansion, a pivot shaft extending transversely to said frame and having one end connected to each walking beam to provide an axis of rotation for the beam and having its other end anchored to said frame, a strut member having one end connected to each pivot shaft adjacent the connection of the shaft to its walking beam and its other end anchored to said frame to restrain longitudinal deflection of the walking beam relative to the frame.

17. The wheel suspension of claim 16 wherein each strut member extends upwardly from its pivot shaft connection diagonally toward the longitudinal center line of said frame.

18. The wheel suspension of claim 17 wherein each strut member includes an arm part and a strut part, each arm part having one end connected to said pivot shaft adjacent the connection of the shaft to its walking beam, said strut part connected at one end to the opposite end of said arm part, the opposite end of said strut part anchored to said frame with the axis of the strut part projecting upwardly toward the longitudinal center line of the frame and through said rotational axis of the walking beam between said wheel assemblies.

19. The wheel suspension of claim 18 wherein the wheel assemblies of each walking beam include spaced wheels having a tracking center, said strut part axis extending through said walking beam rotational axis at a location vertically aligned with the tracking center of the wheels associated with the wheel assemblies of the walking beam.

20. The wheel suspension of claim 19 wherein each strut member extends toward the direction of forward travel of said frame.

* * * * *